May 21, 1929. S. E. SIEURIN 1,714,280
PROCESS FOR THE PRODUCTION OF IRON SPONGE
Filed Dec. 17, 1927
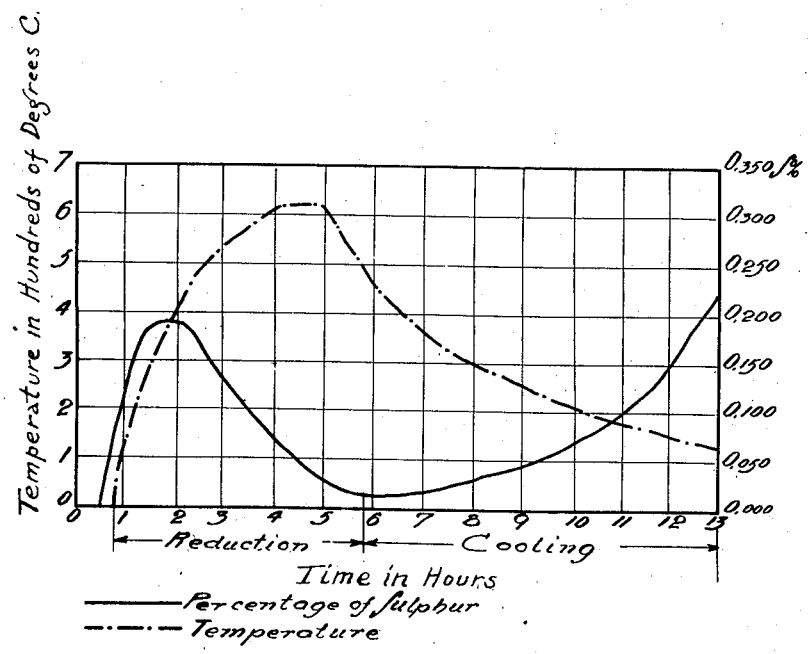
INVENTOR
SVEN EMIL SIEURIN
BY
ATTORNEY Patented May 21, 1929.

1,714,280

UNITED STATES PATENT OFFICE.

SVEN EMIL SIEURIN, OF HOGANAS, SWEDEN.

PROCESS FOR THE PRODUCTION OF IRON SPONGE.

Application filed December 17, 1927, Serial No. 240,908, and in Sweden January 26, 1926.

It has been proposed to produce metals, by first embedding ore in the shape of bricks, pieces or layers or pulverized ore in a solid reducing agent (suitably carbon), heating without any supply of air or any other gas to a temperature necessary for the reduction but under that for melting, and finally by separating the reduced metal at the end of the reducing process from the remaining reducing agent. This process, which is especially suitable for the production of iron sponge, has the disadvantage of affording some difficulties in the production of an iron sponge which is sufficiently free from sulphur, since the process affords several possibilities for the combination with sulphur.

The ore itself may be sulphurous or the reducing agents may contain sulphur, which combines with the ore during the heating process. To overcome the disadvantage of the known methods, the reducing agents may be mixed with the oxides of the common metals of the alkaline earths, calcium and magnesium, which then combine with the sulphur in the ore or the carbonaceous reducing agent to form the sulphides of the common metals of the alkaline earths, the calcium and magnesium having been decomposed from the line and magnesia during the process.

During the heating, forming part of the reducing process, a decomposition of the pyrites and other sulphurous combinations contained in the reducing agents (usually coal or coke) takes place at a comparatively low temperature (400°–700° C.), whereby the sulphur or volatile combinations of same are set free and the sulphur immediately combines with the iron ore, because the lime stone and magnesia which may have been added to the reducing agents have not been decomposed and are not able to combine with sulphur at the said low temperature. It has also been found that on account of these circumstances an ore, heated to 500° C. may contain a percentage of sulphur of several tenths.

Attempts to reduce the percentage of sulphur in the product (iron sponge), obtained from iron ore in the manner stated have proved that such a reduction is possible by using in the process a great excess of carbonaceous reducing agents. The iron sponge produced with only a slight excess over the required carbonaceous reducing agent must be cooled much more rapidly than iron sponge which has been produced in the presence of a great excess of carbonaceous reducing agent in order to obtain the forementioned advantageous results.

It has also been observed that if the percentage of such carbonaceous reducing agents in the ash surrounding the iron sponge, becomes too small, the sulphides of calcium and magnesium, formed by the decomposition of the lime stone and magnesia, as purifier from sulphur, become decomposed and their sulphur is again combined with the iron.

Moreover it has been observed that a slow cooling of the charge contributes to a rapid decrease in the excess of carbon, that may be present. Even if a comparatively large excess of reducing agents (carbon) is present in the ash, a decomposition of the sulphides of calcium and magnesia, which may have been formed, gradually takes place.

It is also quite obvious that the time required for the process and the temperatures to which the ore must be raised depend upon the thickness of the layers of pulverized ore.

In the accompanying drawing a diagram is shown, illustrating how the sulphur is absorbed by the ore and further the desulphurizing during the reducing process of the iron sponge obtained as well as the later repeated absorption of sulphur in the iron sponge. The lowest point of the curve of the percentage of sulphur designates the time when the reduction is finished. The diagram illustrates not only the variations in the percentage of sulphur during the reducing process but also the variations of the temperature during that process. It exemplifies a reducing process carried out during very unfavourable conditions, viz, a process in which the cooling of the reduced product has taken place very slowly. From the above it will be evident that the sulphur is again combined with the iron sponge and this undesirable combination takes place more rapidly the slower the sponge is cooled. This result assumes that a sufficient quantity of reducing agents (carbon) is not present in the ash at the end of the reducing process.

In order to obtain a product which is as free as possible from sulphur the cooling must take place at a rate which varies inversely as the excess of carbon present. In other words if there is a small excess of carbon in the ash the cooling must be rapidly effected and if the excess of carbon present is large the mass may be cooled at a lower rate.

These two facts, the excess of reducing agents in the ash and the rapidity of the cooling corresponding inversely to said excess are of fundamental importance in the production of iron sponge according to the present invention.

Having now particularly described the nature of my invention and the manner of its operation, what I claim is:

A process for the production of iron sponge comprising embedding pulverized iron ore in the desired shape in a carbonaceous reducing agent, heating the mass in the absence of any gas to a temperature less than the melting point of the iron ore but sufficient for the reduction thereof and finally cooling the mass, characterized by the presence of the oxides of the common metals of the alkaline earths, the addition of carbonaceous reducing agent to constitute an excess over that required for the reduction, and cooling the product, said cooling being accelerated so that the sulphide formed in the charge will not be decomposed and will not liberate the combined sulphur, thereby preventing the undesirable absorption thereof by the iron sponge.

In testimony whereof I affix my signature.

SVEN EMIL SIEURIN.